US011794786B2

United States Patent
Akita

(10) Patent No.: US 11,794,786 B2
(45) Date of Patent: Oct. 24, 2023

(54) VEHICLE CONTROL APPARATUS

(71) Applicant: SUZUKI MOTOR CORPORATION, Shizuoka (JP)

(72) Inventor: Akira Akita, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 538 days.

(21) Appl. No.: 16/746,362

(22) Filed: Jan. 17, 2020

(65) Prior Publication Data
US 2020/0231183 A1 Jul. 23, 2020

(30) Foreign Application Priority Data
Jan. 21, 2019 (JP) .................................. 2019-007825

(51) Int. Cl.
| B60W 60/00 | (2020.01) |
| B60W 30/182 | (2020.01) |
| B60W 50/00 | (2006.01) |
| G01C 21/34 | (2006.01) |
| G06Q 10/02 | (2012.01) |
| G05D 1/00 | (2006.01) |

(52) U.S. Cl.
CPC ...... B60W 60/0054 (2020.02); B60W 30/182 (2013.01); B60W 50/0098 (2013.01); B60W 60/0057 (2020.02); B60W 60/0059 (2020.02); B60W 60/00253 (2020.02); G01C 21/3438 (2013.01); G05D 1/0061 (2013.01); G06Q 10/02 (2013.01); G05D 2201/0212 (2013.01)

(58) Field of Classification Search
CPC ....... B60W 60/0054; B60W 60/00253; B60W 60/0059; B60W 60/0057; B60W 30/182; B60W 50/0098; G01C 21/3438; G05D 1/0061; G05D 2201/0212; G06Q 10/02
USPC .......................................................... 701/23
See application file for complete search history.

(56) References Cited

U.S. PATENT DOCUMENTS

| 9,240,018 B2 | 1/2016 | Ricci | |
| 10,053,088 B1 | 8/2018 | Askeland | |
| 10,324,464 B2 | 6/2019 | Hatano et al. | |
| 2017/0282821 A1* | 10/2017 | Zych | G06Q 50/30 |
| 2017/0334450 A1* | 11/2017 | Shiraishi | H04W 4/80 |

(Continued)

FOREIGN PATENT DOCUMENTS

| JP | 2010-117231 A | 5/2010 |
| JP | 2010-117278 A | 5/2010 |

(Continued)

OTHER PUBLICATIONS

Preliminary Search Report for corresponding French Application No. 20 00343 dated Dec. 31, 2021, with English Translation. (15 pp.).

(Continued)

*Primary Examiner* — Maceeh Anwari
(74) *Attorney, Agent, or Firm* — WEIHROUCH IP

(57) ABSTRACT

In a vehicle control apparatus, a controller for controlling a travelling of a vehicle is configured to obtain attribute information about at least one occupant from reservation information, the reservation information including information about the at least one occupant who has made a reservation for the vehicle, and set a travelling characteristic of the vehicle based on the attribute information about at least one occupant.

4 Claims, 7 Drawing Sheets

(56) References Cited

U.S. PATENT DOCUMENTS

2017/0334454 A1    11/2017  Abe et al.
2018/0052000 A1*    2/2018  Larner .................. B60W 30/025
2018/0218230 A1*    8/2018  Naka .................. B60W 50/0098
2018/0335776 A1*   11/2018  Theis .................. B60W 50/082

FOREIGN PATENT DOCUMENTS

JP      2017-206152 A    11/2017
JP      2017-206239 A    11/2017
JP      2018-122750 A     8/2018
JP          6368957 B2     8/2018

OTHER PUBLICATIONS

Office Action for corresponding Indian Application No. 20201400198 dated Oct. 25, 2021, with English Translation. (5 pp.).
Office Action for corresponding Indian Application No. 202014001982 dated Oct. 25, 2021, with English Translation. (5 pp.).
Japanese Office Action for JP Application No. 2019-007825 dated Sep. 6, 2022, with machine English translation. (7 pages).
Notice of Reasons for Refusal for Japanese Patent Application No. 2019-007825 dated Jan. 17, 2023 (6 pages).

* cited by examiner

FIG. 2

| PRIORITY ORDER | CONDITION | SELECTED MODE |
|---|---|---|
| 1 | A > 0<br>B > 0 | TOTAL VIBRATION REDUCTION MODE<br>• SET RATE OF CHANGE OF ACCELERATION OR DECELERATION TO BE SMALLER<br>• MAKE START TIMING OF EACH OF BRAKING AND ACCELERATION OF VEHICLE<br>• SET RATE OF CHANGE OF STEERING ANGLE TO BE SMALLER<br>• PERFORM ACCELERATION OR DECELERATION OF VEHICLE IN ACCORDANCE WITH RATE OF CHANGE OF STEERING ANGLE |
| 2 | A > 0<br>B = 0 | LONGITUDINAL-VIBRATION REDUCTION MODE<br>• SET RATE OF CHANGE OF ACCELERATION OR DECELERATION TO BE SMALLER<br>• MAKE START TIMING OF EACH OF BRAKING AND ACCELERATION OF VEHICLE |
| 3 | A = 0<br>B > 0 | LATERAL-VIBRATION REDUCTION MODE<br>• SET RATE OF CHANGE OF STEERING ANGLE TO BE SMALLER<br>• PERFORM ACCELERATION OR DECELERATION OF VEHICLE IN ACCORDANCE WITH RATE OF CHANGE OF STEERING ANGLE |
| 4 | A = B = 0<br>C > 0 | FULLY SEATED MODE<br>SET SMALLER LIMITATION WIDTH IN FULLY SEATED MODE THAN LIMITATION WIDTH IN TOTAL VIBRATION REDUCTION MODE |
| 5 | A = B = C = 0 | NORMAL TRAVELLING MODE |

FIG. 3

| PRIORITY ORDER | CONDITION | SELECTED MODE |
|---|---|---|
| 1 | A>0, B>0 | ROUTE WITH SMALLER NUMBER OF TRAFFIC LIGHTS AND SMALLER MAXIMUM STEERING ANGLE |
| 2 | A>0, B=0 | ROUTE WITH SMALLER NUMBER OF TRAFFIC LIGHTS |
| 3 | A=0, B>0 | ROUTE WITH SMALLER MAXIMUM STEERING ANGLE |
| 4 | A=B=0<br>C>0 | ROUTE WITH SMALLER NUMBER OF TRAFFIC LIGHTS AND SHORTER TRAVELLING TIME |
| 5 | A=B=C=0 | NORMAL TRAVELLING ROUTE |

VEHICLE CONTROL APPARATUS

CROSS-REFERENCE

This application claims the benefit of Japanese Application Number 2019-007825, filed Jan. 21, 2019, the disclosures of which are incorporated herein in their entirety by reference.

TECHNICAL FIELD

The present invention relates to vehicle control apparatuses.

BACKGROUND ART

In recent years, autonomous driving functions have been being developed. For increasing safety of occupants in an autonomous vehicle that is travelling in an autonomous driving mode, the autonomous vehicle is required to control its travelling operations in the autonomous driving mode.

Japanese Patent application publication No. 2018-122750 discloses an apparatus installed in a vehicle. The apparatus disclosed in the published patent document is capable of switching between a manual driving mode for assisting a driver's driving of the vehicle, and an autonomous driving mode for autonomously driving the vehicle.

In particular, the apparatus disclosed in the published patent document turns on an in-vehicle camera after start of the autonomous driving mode to thereby grasp the state of each occupant in the vehicle using the in-vehicle camera, and changes the running characteristics of the vehicle in the autonomous driving mode in accordance with the monitored state of each occupant in the vehicle.

For example, the apparatus disclosed in the published patent document 1 changes the running characteristics of the vehicle in the autonomous driving mode such that the changed running characteristics of the vehicle provide higher quiet running-performance upon detection of at least one sick occupant and/or at least one aged occupant.

SUMMARY

Technical Problem

The above apparatus disclosed in the published patent document is configured to
(1) Turn on the in-vehicle camera after start of the autonomous driving mode
(2) Grasp the state of each occupant in the vehicle using the in-vehicle camera
(3) Change the running characteristics of the vehicle in the autonomous driving mode after completion of grasping the state of each occupant in the vehicle This therefore may make it difficult to set the running characteristics of the vehicle to adjusted running characteristics of the vehicle suitable for the grasped state of each occupant during the period from the start of the autonomous driving mode to the completion of grasping the state of each occupant in the vehicle. This may have difficulty in increasing the safety of each occupant in the vehicle being in the autonomous driving mode.

From this viewpoint, the present invention aims to provide apparatuses for controlling a vehicle, each of which is capable of making, based on an attribute of at least one occupant, earlier a timing to perform control of a travelling operation of the vehicle for increasing safety of the at least one occupant. This makes it possible to increase the opportunities for increasing the safety of the at least one occupant.

An aspect of the present invention is a vehicle control apparatus. The vehicle control apparatus includes a controller for controlling a travelling of a vehicle. The controller is configured to obtain attribute information about at least one occupant from reservation information, the reservation information including information about the at least one occupant who has made a reservation for the vehicle, and set a travelling characteristic of the vehicle based on the attribute information about at least one occupant.

Advantageous Effects of Invention

This aspect of the present invention makes it possible to obtain, from the reservation information, the attribute information about at least one occupant riding on the vehicle. This therefore makes earlier the timing to set the travelling characteristic of the vehicle based on the attribute information about the at least one occupant riding on the vehicle.

BRIEF DESCRIPTION OF DRAWINGS

FIG. 2 is a table schematically illustrating an example of selectable travelling modes of the driverless operation system according to the exemplary embodiment of the present invention;

FIG. 3 is a table schematically illustrating an example of selectable travelling routes of the driverless operation system according to the exemplary embodiment of the present invention;

DESCRIPTION OF EMBODIMENTS

An exemplary aspect of the present invention is a vehicle control apparatus. The vehicle control apparatus includes a controller for controlling a travelling of a vehicle. The controller is configured to obtain attribute information about at least one occupant from reservation information, the reservation information including information about the at least one occupant who has made a reservation for the vehicle, and set a travelling characteristic of the vehicle based on the attribute information about at least one occupant.

This aspect of the present invention makes it possible to obtain, from the reservation information, the attribute information about at least one occupant riding on the vehicle. This therefore makes earlier the timing to set the travelling characteristic of the vehicle based on the attribute information about the at least one occupant riding on the vehicle, thus increasing the opportunities for increasing the safety of the at least one occupant.

[Embodiments]

The following describes in detail a driverless operation system according to an exemplary embodiment of the present invention.

Figure 1:
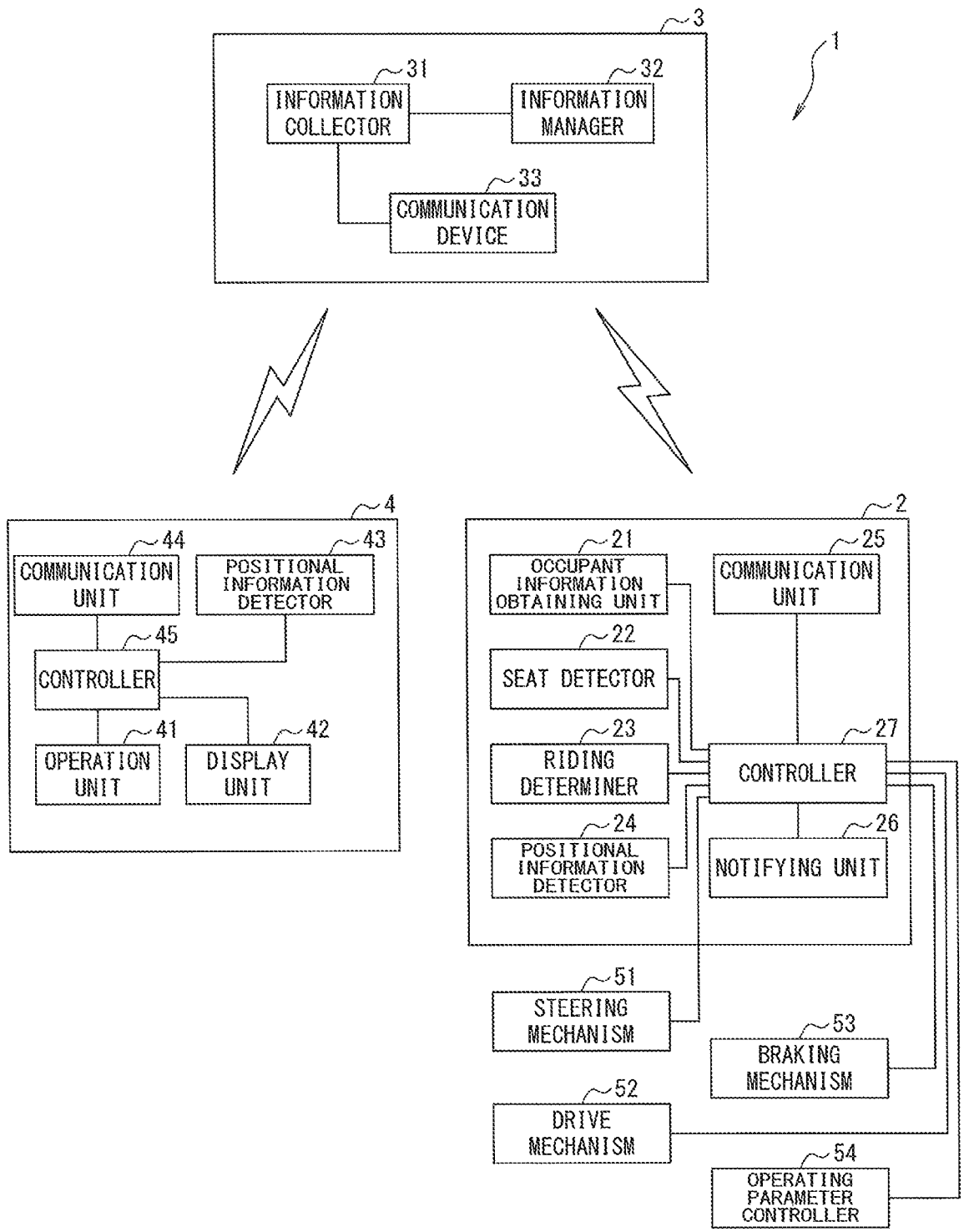
FIG. 1 is an overall structural block diagram schematically illustrating a driverless operation system according to an exemplary embodiment of the present invention.

Referring to FIG. 1, a driverless operation system 1 according to the exemplary embodiment of the present invention includes vehicular control apparatuses 2, a server 3, and information terminals 4. The driverless operation system 1 is configured such that each of a plurality of driverless autonomous vehicles, i.e. each of a plurality of autonomous buses, which incorporates therein a corresponding one of the vehicular control apparatuses 2, is controlled to travel through a predetermined service route on which plural stations are provided. That is, the service route includes the stations, and a plurality of travelling sections, each of which is located between a corresponding adjacent pair of the stations. Each of the autonomous vehicles is scheduled to 1. Depart from a first departure place, i.e. a first departure station
2. Arrive at each station at a scheduled arrival time
3. Depart from each station at a scheduled departure time
4. Finally arrive at a final target place, i.e. a final target station In particular, the driverless operation system 1 according to the exemplary embodiment is configured as a complete reservation bus operation system that enables only users with reservation through, for example, the information terminals 4 to take a selected autonomous vehicle as reservation occupants or occupants.

Description of Vehicular Control Apparatus 2

The vehicular control apparatus 2 is installed in each autonomous vehicle, and is configured to control a travelling of the autonomous vehicle.

Specifically, the vehicular control apparatus 2 installed in each autonomous vehicle includes an occupant information obtaining unit 21, a seat detector 22, a riding determiner 23, a positional information detector 24, a communication unit 25, a notifying unit 26, and a controller 27.

The occupant information obtaining unit 21 is configured to obtain attribute information about each occupant based on reservation information, which will be described later, about the corresponding occupant obtained from the server 3 via the communication unit 25.

The attribute information about each occupant represents, for example, at least one of the types of sensitivity of the corresponding occupant to the travelling of the corresponding autonomous vehicle.

For example, the attribute information about each occupant includes (1) Whether the corresponding occupant is a first type of a longitudinal-vibration sensitive occupant who is sensitive to longitudinal vibrations in the corresponding autonomous vehicle, such as a pregnant woman, an infant, or an occipital disease person
(2) Whether the corresponding occupant is a second type of a lateral-vibration sensitive occupant who is sensitive to lateral vibrations, such as a leg-broken occupant
(3) Whether the corresponding occupant is a third type of a less-sensitive occupant who is less sensitive to vibrations, such as a healthy occupant The occupant information obtaining unit 21 can be configured to obtain, in addition to the attribute information about each occupant, attribute-information management information based on the reservation information obtained from the server 3 via the communication unit 25.

The attribute-information management information includes, for example, the number of occupants for each type of the sensitivity in accordance with the attribute information about each occupant.

For example, the attribute-information management information can include (1) The number of one or more longitudinal-vibration sensitive occupants of the first type
(2) The number of one or more lateral-vibration sensitive occupants of the second type
(3) The number of one or more less-sensitive occupants to vibrations
(4) The number of one or more standing occupants in the less-sensitive persons to vibrations The attribute-information management information can be generated by the server 3 and attached to the reservation information.

The occupant information obtaining unit 21 can be configured to generate the attribute-information management information based on the reservation information, and transmit the attribute-information management information to the controller 27.

The controller 27 can be configured to directly obtain, from the server 3, the attribute information about each occupant and the attribute-information management information, making it possible to eliminate the occupant information obtaining unit 21 from the vehicular control apparatus 2 installed in each autonomous vehicle in the exemplary embodiment except for first and second modifications of the exemplary embodiment described later.

The seat detector 22 of the vehicular control apparatus 2 installed in each autonomous vehicle is for example comprised of seat sensors provided for the respective seats of the corresponding autonomous vehicle, and is configured to determine whether an occupant is seated on each seat detected by the corresponding seat sensor.

The riding determiner 23 of the vehicular control apparatus 2 installed in each autonomous vehicle is comprised of, for example, a receiver and/or an input device. The riding determiner 23 is configured to determine whether each user rides on the corresponding autonomous vehicle as an occupant based on riding determination information received by the receiver sent from a selected information terminal 4 and/or an integrated circuit (IC) card used for the corresponding user, i.e. the corresponding occupant. The riding determiner 23 can be configured to determine whether each user rides on the corresponding autonomous vehicle as an occupant based on the riding determination information inputted by the corresponding occupant through the input device.

The riding determination information about each occupant can include occupant identification information about the corresponding occupant for uniquely identifying the corresponding occupant, such as the name and/or an occupant identification (ID) number. The riding determination information about each occupant can include reservation-occupant identification information about identifying whether the corresponding occupant is an occupant that has made a reservation for the corresponding autonomous vehicle. The reservation-occupant identification information will be described later.

The riding determiner 23 of the vehicular control apparatus 2 installed in each autonomous vehicle obtains, from the receiver or the input device, the riding determination information about an occupant each time the occupant rides on the corresponding autonomous vehicle. The controller 27 determines whether any of the reservation occupants has ridden in the corresponding autonomous vehicle in accordance with the riding determination information about each occupant.

Note that the vehicular control apparatus 2 installed in each autonomous vehicle can include an alighting determiner, which has a configuration similar to the configuration of the riding determiner, for determining whether each occupant has alighted from the corresponding autonomous vehicle based on alighting determination information received by a receiver of the alighting determiner sent from a selected information terminal 4 and/or an IC card used for the corresponding occupant. The alighting determiner of the vehicular control apparatus 2 installed in each autonomous vehicle obtains, from the receiver or the input device, the alighting determination information about an occupant each time the occupant alights from the corresponding autonomous vehicle. The controller 27 determines whether any of the reservation occupants has alighted from the corresponding autonomous vehicle in accordance with the alighting determination information about each occupant.

That is, the controller 27 of the vehicular control apparatus 2 installed in each autonomous vehicle makes it possible to recognize each of incoming occupants into the corresponding autonomous vehicle based on the riding information about the corresponding one of the incoming occupants, and each of outgoing occupants from the corresponding autonomous vehicle based on the alighting information about the corresponding one of the outgoing occupants. This enables the controller 27 of the vehicular control apparatus 2 installed in each autonomous vehicle to identify one or more occupants in the corresponding autonomous vehicle.

The positional information detector 24 of the vehicular control apparatus 2 installed in each autonomous vehicle includes an unillustrated global navigation satellite system (GNSS) antenna, and receives, via the GNSS antenna, radio signals, which are sent from GNSS satellites, to thereby obtain information about, for example, the latitude and longitude of the current position of the GNSS antenna of the corresponding autonomous vehicle based on the received radio signals.

The communication unit 25 communicates with, for example, the server 3 or other devices via communication media including radio communication networks to thereby transmit information to, for example, the server 3 or other devices, and receive information transmitted from, for example, the server 3 or other devices.

The notifying unit 26 of the vehicular control apparatus 2 installed in each autonomous vehicle is comprised of one or more output devices including, for example, a monitor, a speaker, lamps, meters, beepers, and a liquid crystal display device located outside the body of the corresponding autonomous vehicle, and is configured to output various items of information through at least one of the five physical senses using the one or more output devices.

The controller 27 is configured as a computer unit comprised of a central processing unit (CPU), a random access memory (RAM), a read only memory (ROM), a flash memory for storing backup data, one or more input ports, and one or more output ports.

Various constant values, various maps, and one or more programs are stored in the ROM of the computer unit; the one or more programs cause the computer unit to serve as the controller 27.

Specifically, the CPU executes, in a workspace in the RAM, the one or more programs stored in the ROM to thereby serve as the controller 27 of the first embodiment.

The occupant information obtaining unit 21, seat detector 22, riding determiner 23, positional information detector 24, and various sensors are communicably connected to the controller 27 via the one or more input ports of the control unit.

In the vehicular control apparatus 2 installed in each autonomous vehicle, the communication unit 25, notifying unit 26, and various control targets including unillustrated doors of the corresponding autonomous vehicle are communicably connected to the controller 27 via the one or more output ports of the control unit.

Each of the autonomous vehicles includes driving wheels, a steering mechanism 51 for steering the driving wheels, a drive source, and a drive mechanism 52 for driving the drive source so that the drive source outputs drive power to the driving wheels. Each of the autonomous vehicles also includes a braking mechanism 53 for applying braking force to the driving wheels, and an operating parameter controller 54. The operating parameter controller 54 of each autonomous vehicle is configured to control operating parameters for each of the steering mechanism 51, drive mechanism 52, and braking mechanism 53 in accordance with the travelling characteristics of the corresponding autonomous vehicle set or changed by the controller 27. These mechanisms 51 to 53 are communicably connected to the operating parameter controller 54, and the components 51 to 54 are communicably connected to the controller 27 via the one or more output ports of the control unit.

The controller 27 of the vehicular control apparatus 2 installed in each autonomous vehicle is configured to control the travelling characteristics of the corresponding autonomous vehicle between each travelling section of the service route between the corresponding adjacent pair of the stations in accordance with the attribute information about each occupant riding in the corresponding autonomous vehicle.

The server 3 is configured as a computer unit comprised of an unillustrated CPU, a RAM, a ROM, a storage device, such as a hard-disk drive, one or more input ports, and one or more output ports.

One or more programs are stored in the hard-disk drive; the one or more programs cause the CPU to serve as an information collector 31 and an information manager 32. Specifically, the CPU executes the one or more programs stored in the hard-disk drive to thereby cause the server 3 to function as the information collector 31 and information manager 32.

The server 3 includes a communication device 33 that communicates with the vehicular control apparatus 2 installed in each autonomous vehicle and information terminals 4 via communication media including radio communication networks to thereby transmit information to the vehicular control apparatus 2 installed in each autonomous vehicle and information terminals 4, and receive information transmitted from the vehicular control apparatus 2 installed in each autonomous vehicle and information terminals 4.

The information collector 31 receives occupant information and reservation request information sent from at least one information terminal 4, and stores the occupant information and reservation request information in the hard-disk drive of the server 3. The meaning of each of the occupant information and reservation request information will be described later.

The information manager 32 is configured to generate, based on the occupant information and reservation request information stored in the hard-disk drive, (1) First information about a reservation status of each station where one or more occupants, who has sent the reservation request information to the server 3, get on/off (2) Second information about one or more occupants who get on/off each station For example, each travelling section of the service route is defined from a corresponding start station in the stations inclusive to an adjacent station in the stations inclusive. That is, a station located between a first section and an adjacent second section in the travelling direction of the corresponding autonomous vehicle serves as both an end station of the first section and a start station of the second section.

The information manager 32 is configured to manage the first information and the second information as the reservation information.

The information manager 32 is configured to send, to the vehicular control apparatus 2 installed in each autonomous vehicle, at least one of various pieces of the server management information managed thereby in response to a sending request for the at least one of the various pieces of the server management information.

Each information terminal 4 is configured as a computer unit comprised of a CPU, a RAM, a ROM, a flash memory, one or more input ports, and one or more output ports.

An operating system (OS) is stored in the ROM of the computer unit; the OS causes the computer unit to serve as the information terminal 4.

Specifically, the CPU executes the OS stored in the ROM to thereby serve as the information terminal 4.

Each information terminal 4 is comprised of, for example, a smartphone or a personal computer.

Each information terminal 4 includes an operation unit 41, a display unit 42, a positional information detector 43, a communication unit 44, and a controller 45.

The operation unit 41 is comprised of, for example, an input device, such as a touch sensor, switches, a keyboard, and a mouse, and is configured to receive input information inputted based on a user's operation of the input device.

The display unit 42 is comprised of, for example, an image display, such as a liquid-crystal display, and is configured to display, for example, images generated by the controller 45.

The positional information detector 43 includes an unillustrated GNSS antenna, and receives, via the GNSS antenna, radio signals, which are sent from GNSS satellites, to thereby obtain information about, for example, the latitude and longitude of the current position of the GNSS antenna of the corresponding information terminal 4 based on the received radio signals.

The communication unit 44 communicates with, for example, the server 3 or other devices via communication media including radio communication networks to thereby transmit information to the server 3 or the other devices, and receive information transmitted from the server 3 or the other devices.

The controller 45 is configured to execute one or more programs, which are stored in, for example, the ROM, on the OS. That is, the controller 45 performs, based on the one or more programs, control of the above operation unit 41, display unit 42, positional information detector 43, and communication unit 44 to thereby obtain information, display images on the display unit 42, and transmit information to other devices.

The controller 45 of each information terminal 4 prompts a corresponding user to input the occupant information and the reservation request information using the operation unit 41.

The occupant information about each user, i.e. each occupant, includes information about the corresponding user.

The reservation request information about each user, i.e. each occupant, includes information indicative of when the corresponding user is scheduled to ride in a selected autonomous vehicle in the plurality of autonomous vehicles at a selected station in the stations.

For example, the controller 45 causes the display unit 42 to display a personal information setting image that prompts a corresponding user to input, on the personal information setting image, items of the occupant information, which include the name, address, the gender, the date of birth, and individual special comments, of the corresponding user.

The personal information setting image is preferably configured such that a user to easily input data for each of the individual special comments that include the following questions (1) Do you have any injured portions?

(2) Where are the injured portions, which should be answered only if the question (1) is YES?

(3) Do you have weak legs?

(4) Do you use a stick?

(5) Do you have weak eyes?

(6) Do you have a weak grip?

(7) Do you have weak ears?

(8) Do you accompany babies and/or infants?

(9) Are you pregnant?

(10) Do you have a broken bone?

The controller 45 of each information terminal 4 recognizes the occupant information set by the corresponding user, i.e. the corresponding occupant, on the personal information setting image, and transmits, to the server 3, the occupant information set by the corresponding occupant such that the occupant information about the corresponding occupant correlates with corresponding identification (ID) information about the corresponding occupant, which uniquely identifies the corresponding occupant.

The information collector 31 of the server 3 receives the occupant information about each occupant from the corresponding information terminal 4, and stores the occupant information about each occupant in the hard-disk drive of the server 3 such that the occupant information about each occupant correlates with the corresponding ID information.

For example, the controller 45 causes the display unit 42 to display a reservation image that prompts a corresponding user to input, on the reservation image, items of the reservation request information, which include (1) Which of the stations the corresponding user is scheduled to ride in a corresponding selected autonomous vehicle (2) Which of the stations the corresponding user is scheduled to alight from (get off) the selected autonomous vehicle (3) The reservation date and time the corresponding user is scheduled to ride in the selected autonomous vehicle The controller 45 of each information terminal 4 recognizes the reservation request information inputted by the corresponding user, i.e. the corresponding occupant, on the reservation image, and transmits, to the server 3, the reservation request information inputted by the corresponding occupant such that the reservation request information about the corresponding occupant correlates with the corresponding ID information about the corresponding occupant.

The information collector 31 of the server 3 receives the reservation request information about each occupant from the corresponding information terminal 4, and stores the reservation request information about each occupant in the hard-disk drive of the server 3 such that the reservation request information about each occupant correlates with the corresponding ID information. Then, the information collector 31 of the server 3 transmits, to each information terminal 4 that has transmitted the reservation request information, a reservation completion report to the corresponding information terminal 4. This results in each user, who has sent to the reservation request information to the server 3, being registered as a reservation occupant.

When receiving the reservation completion report, the controller 45 of each information terminal 4 is configured to transmit, to the server 3, the current positional information about the corresponding user, i.e. corresponding reservation occupant, obtained by the positional information detector 43 together with the corresponding ID information every predetermined interval from a predetermined time before the reservation time.

Each time of receiving the current positional information sent from each information terminal 4, the information collector 31 of the server 3 transmits, to the vehicular control apparatus 2 of the selected autonomous vehicle on which the corresponding user (reservation occupant) is scheduled to ride, the received current positional information together with the corresponding ID information.

This enables the vehicular control apparatus 2 of the selected autonomous vehicle on which each user (reservation occupant) is scheduled to ride to recognize the current position of each user (reservation occupant) who is scheduled to ride on the selected autonomous vehicle.

The information manager 32 of the server 3 is configured to generate, based on the reservation request information about each user (reservation occupant), the reservation information including (1) The first information about the reservation status of each travelling section of the service route, each travelling section being defined from a corresponding start station in the stations inclusive to an adjacent station in the stations inclusive, in other words, the first information about the reservation status of each station where one or more occupants get on/off (2) The second information about one or more occupants who get on/off each station For example, the reservation information about each autonomous vehicle includes 1. The scheduled arrival time of the corresponding autonomous vehicle
2. The number of one or more occupants riding on the corresponding autonomous vehicle when the corresponding autonomous vehicle arrives at each station
3. The number of one or more users, i.e. one or more reservation occupants, who are getting on the corresponding autonomous vehicle at each station
4. The number of one or more occupants who are getting off the corresponding autonomous vehicle at each station
5. The number of one or more occupants riding on the corresponding autonomous vehicle when the corresponding autonomous vehicle leaves from each station
6. The attribute information about each of one or more occupants riding on the corresponding autonomous vehicle
7. The attribute information about each of one or more occupants waiting for the corresponding autonomous vehicle at each station For example, the attribute information about each of the riding occupants and waiting occupants can be generated based on the corresponding occupant information set on the personal setting information image.

The attribute information about each occupant includes
(1) Whether the corresponding occupant is the first type of longitudinal-vibration sensitive occupant, such as a pregnant woman, an infant, or an occipital disease person
(2) Whether the corresponding occupant is a second type of lateral-vibration sensitive occupant, such as a leg-broken occupant
(3) Whether the corresponding occupant is a third type of less-sensitive occupant to vibrations, such as a healthy occupant For example, the controller 27 of the vehicular control apparatus 2 installed in each autonomous vehicle is configured to
(1) Obtain, while the corresponding autonomous vehicle is travelling in a current travelling section of the service route, the reservation information about the next travelling section managed by the server 3
(2) Set, based on the attribute information about each occupant that is riding on the corresponding autonomous vehicle for the next station, the travelling characteristics of the next travelling section before the corresponding autonomous vehicle departs from the start station of the next travelling section Specifically, the controller 27 of the vehicular control apparatus 2 installed in each autonomous vehicle obtains, while the corresponding autonomous vehicle is travelling in the current travelling section of the service route, the reservation information about the next travelling section from the server 3. Then, the controller 27 recognizes, based on the reservation information about the next travelling section from the server 3, the attribute information about each of all of riding occupants, who are scheduled to ride on the corresponding autonomous vehicle in the next travelling section, including
1. At least one reservation occupant who is scheduled to ride on the corresponding autonomous vehicle at the start station of the next travelling section
2. At least one reservation occupant who is scheduled to have been riding continuously to the next travelling section from the current travelling section Next, the controller 27 sets the travelling characteristics of the next travelling section in accordance with the attribute information about the at least one reservation occupant who is scheduled to ride on the corresponding autonomous vehicle at the start station of the next travelling section, and the attribute information about the at least one reservation occupant who is scheduled to have been riding continuously to the next travelling section.

For example, the controller 27 calculates the number of one or more longitudinal-vibration sensitive occupants, which will be referred to as a first number A, the number of one or more lateral-vibration sensitive occupants, which will be referred to as a second number B, and the number of one or more standing less-sensitive occupants to vibrations, which will be referred to as a third number C, in accordance with 1. The attribute information about each of all the riding occupants scheduled to ride on the corresponding autonomous vehicle in the next travelling section
2. The number of all seats in the corresponding autonomous vehicle For example, the controller 27 calculates the first number A and the second number B based on the attribute information about each of all of the riding occupants scheduled to ride on the corresponding autonomous vehicle in the next travelling section.

Next, the controller 27 calculates the number of one or more less-sensitive occupants to vibrations based on the reservation information about all of the riding occupants on the corresponding autonomous vehicle.

Then, the controller 27 compares the sum of the first and second numbers A and B with the number of all seats in the corresponding autonomous vehicle to thereby determine whether there is at least one empty seat in the corresponding autonomous vehicle assuming that the longitudinal-vibration and lateral-vibration sensitive occupants are seated on corresponding seats in the corresponding autonomous vehicle.

Upon determination that there is at least one empty seat in the corresponding autonomous vehicle, the controller 27 calculates the number of at least one empty seat in the corresponding autonomous vehicle. Then, the controller 27 for example subtracts, from the number of one or more less-sensitive occupants to vibrations, the number of at least one empty seat to thereby estimate the result of the subtraction as the third number C, i.e. the number of one or more standing less-sensitive occupants to vibrations, in the corresponding autonomous vehicle.

Otherwise, upon determination that there are no empty seats in the corresponding autonomous vehicle, the controller 27 estimates that the number of one or more less-sensitive occupants to vibrations as the third number C.

After calculation of the first number A, second number B, and third number C, the controller 27 selectively determines the travelling mode of the corresponding autonomous vehicle to one of previously prepared travelling modes based on a map M1 for example stored therein, which illustrated in FIG. 2. This sets the travelling characteristics of the corresponding autonomous vehicle in accordance with the determined travelling mode.

Specifically, as illustrated in FIG. 2, the controller 27 sets the travelling mode of the corresponding autonomous vehicle to a normal travelling mode upon determination that each of the first number A, second number B, and third number C is equal to 0.

In the normal travelling mode, the controller 27 controls the steering mechanism 51 to thereby adjust a steering angle of the corresponding autonomous vehicle using a predetermined normal value of the rate of change of the steering angle.

In the normal travelling mode, the controller 27 controls the drive mechanism 52 to thereby perform acceleration of the corresponding autonomous vehicle at a predetermined normal start timing using a predetermined normal value of the rate of change of the acceleration.

In the normal travelling mode, the controller 27 controls the braking mechanism 53 to thereby perform braking, i.e. deceleration, of the corresponding autonomous vehicle at a predetermined normal start timing using a predetermined normal value of the rate of change of the deceleration.

As illustrated in FIG. 2, the controller 27 sets the travelling mode of the corresponding autonomous vehicle to a total vibration reduction mode upon determination that each of the first number A and second number B is more than 0.

Specifically, in the total vibration reduction mode, the controller 27 controls the steering mechanism 51 to thereby adjust the steering angle of the corresponding autonomous vehicle while setting a value of the rate of change of the steering angle to be smaller than the normal value of the rate of change of the steering angle.

In the total vibration reduction mode, the controller 27 controls the drive mechanism 52 and/or braking mechanism 53 to thereby perform the acceleration or deceleration of the corresponding autonomous vehicle in accordance with the rate of change of the steering angle while (1) Setting a value of the rate of change of the acceleration or deceleration of the corresponding autonomous vehicle to be smaller than the normal value of the rate of change of the acceleration or deceleration
(2) Making the start timing of each of the acceleration and braking of the corresponding autonomous vehicle earlier by a predetermined time than the normal start timing of the corresponding one of the braking and the acceleration As illustrated in FIG. 2, the controller 27 sets the travelling mode of the corresponding autonomous vehicle to a longitudinal-vibration reduction mode upon determination that the first number A is more than 0, and the second number B is equal to 0.

Specifically, in the longitudinal-vibration reduction mode, the controller 27 controls the drive mechanism 52 or braking mechanism 53 to thereby perform the acceleration or deceleration of the corresponding autonomous vehicle while (1) Setting a value of the rate of change of the acceleration or deceleration of the corresponding autonomous vehicle to be smaller than the corresponding one of the normal value of the rate of change of the acceleration or deceleration
(2) Making the start timing of each of the braking and acceleration of the corresponding autonomous vehicle earlier by a predetermined time than the normal start timing of the corresponding one of the braking and acceleration As illustrated in FIG. 2, the controller 27 sets the travelling mode of the corresponding autonomous vehicle to a lateral-vibration reduction mode upon determination that the first number A is equal to 0, and the second number B is more than 0.

Specifically, in the lateral-vibration reduction mode, the controller 27 controls the steering mechanism 51 and drive mechanism 52 or braking mechanism 53 to adjust the steering angle and perform the acceleration or deceleration while (1) Setting a value of the rate of change of the steering angle to be smaller than the normal value of the rate of change of the steering angle
(2) Performing the acceleration or deceleration of the corresponding autonomous vehicle in accordance with the rate of change of the steering angle As illustrated in FIG. 2, the controller 27 sets the travelling mode of the corresponding autonomous vehicle to a fully seated mode upon determination that each of the first number A and second number B is equal to 0, and the third number C is more than 0.

Specifically, in the fully seated mode, the controller 27 controls the steering mechanism 51 and drive mechanism 52 or braking mechanism 53 to adjust the steering angle and perform the acceleration or deceleration while (1) Setting a value of the rate of change of the steering angle to be smaller than the value of the rate of change in the total vibration reduction mode
(2) Setting a value of the rage of change of the acceleration or deceleration to be smaller than the value of the rate of change of the acceleration or deceleration in the total vibration mode
(3) Setting a predetermined time by which the start timing of the acceleration or deceleration of the corresponding autonomous vehicle to be smaller than the predetermined time by which the start timing of the acceleration or deceleration of the corresponding autonomous vehicle in the total vibration mode
(4) Setting the amount of the acceleration or deceleration of the corresponding autonomous vehicle to be smaller than the amount of the acceleration or deceleration of the corresponding autonomous vehicle in the total vibration mode in accordance with the value of the rate of change of the steering angle The controller 27 can be configured to search for a suitable traveling route in the next travelling section in accordance with the attribute information about each of all the riding occupants scheduled to ride on the corresponding autonomous vehicle in the next travelling section, and change a predetermined normal route in the next travelling section to the suitable travelling route.

In particular, the controller 27 can be configured to search for a suitable travelling route using a departure station and a target station of the next travelling section as a search condition, or select one of previously prepared travelling routes as the suitable travelling route.

For example, the controller 27 searches for a suitable travelling route based on a map M2 for example stored therein, which illustrated in FIG. 3.

Specifically, as illustrated in FIG. 3, the controller 27 sets a normal travelling route as the travelling route of the corresponding autonomous vehicle in the next travelling section upon determination that each of the first number A, second number B, and third number C is equal to 0, which will be referred to as a normal condition.

The normal travelling route has a predetermined reference number of traffic lights, a predetermined reference maximum steering angle, and a predetermined reference travelling time required for the corresponding autonomous vehicle to travel on the normal travelling route at a predetermined constant travelling speed.

The controller 27 sets a first travelling route as the travelling route of the corresponding autonomous vehicle in the next travelling section upon determination that each of the first number A and second number B is more than 0, which will be referred to as a first route condition.

The first travelling route has a predetermined number of traffic lights smaller than the reference number of traffic lights, and a predetermined maximum steering angle smaller than the reference maximum steering angle.

As illustrated in FIG. 3, the controller 27 sets a second travelling route as the travelling route of the corresponding autonomous vehicle in the next travelling section upon determination that the first number A is more than 0, and the second number B is equal to 0, which will be referred to as a second route condition.

The second travelling route has a predetermined number of traffic lights smaller than the reference number of traffic lights.

As illustrated in FIG. 3, the controller 27 sets a third travelling route as the travelling route of the corresponding autonomous vehicle in the next travelling section upon determination that the first number A is equal to 0, and the second number B is more than 0, which will be referred to as a third route condition.

The third travelling route has a predetermined maximum steering angle smaller than the reference maximum steering angle.

As illustrated in FIG. 3, the controller 27 sets a fourth travelling route as the travelling route of the corresponding autonomous vehicle in the next travelling section upon determination that each of the first number A and second number B is equal to 0, and the third number C is more than 0, which will be referred to as a fourth route condition.

The fourth travelling route has a predetermined number of traffic lights smaller than the reference number of traffic lights, and a predetermined travelling time required for the corresponding autonomous vehicle to travel on the fourth travelling route at the predetermined constant travelling speed being shorter than the reference travelling time.

Note that the controller 27 can be configured to search for a suitable travelling route of the corresponding autonomous vehicle in the next travelling section in accordance with one of the travelling mode selected based on the attribute information about each occupant riding on the corresponding autonomous vehicle in the next travelling section. Then, the controller 27 can be configured to set the travelling route of the corresponding autonomous vehicle in the next travelling section to the searched suitable travelling route.

Figure 4:
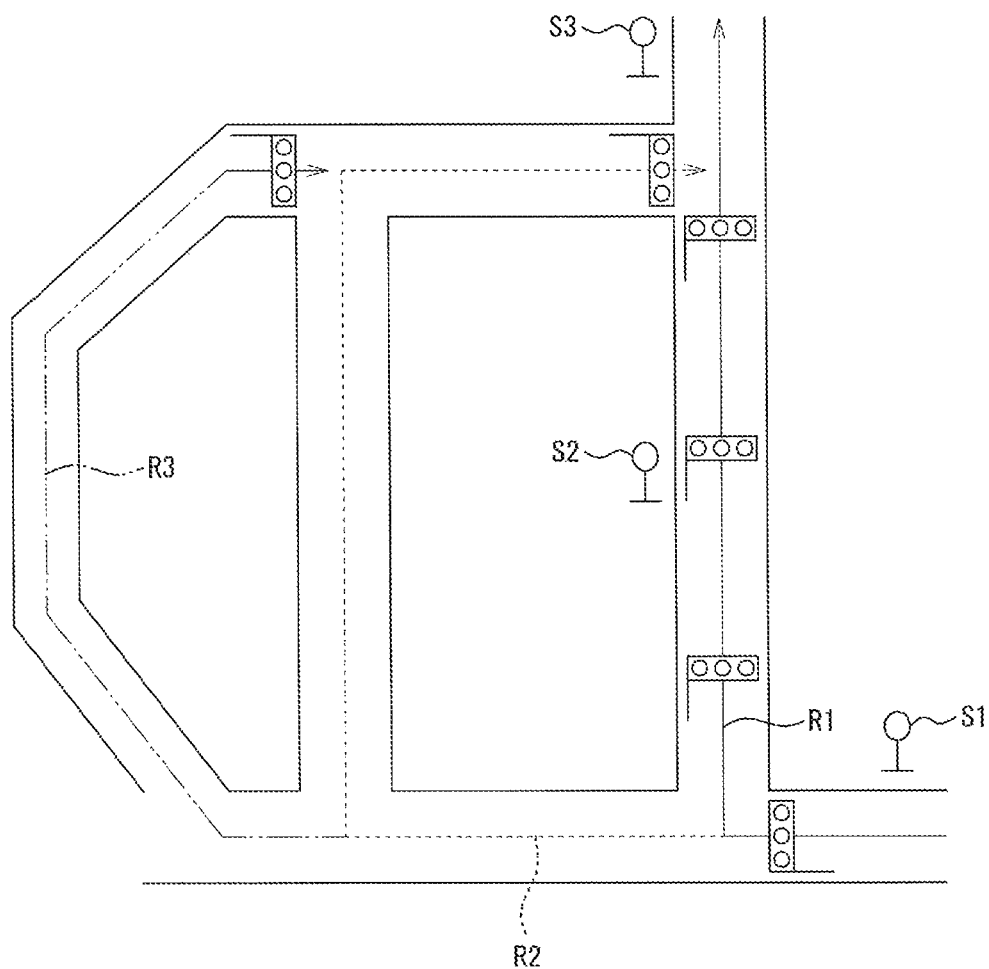
FIG. 4 is a diagram schematically illustrating an example of travelling routes according to the exemplary embodiment of the present invention.

The following describes an example of how the controller 27 searches for a suitable travelling route of an autonomous vehicle. As illustrated in FIG. 4, in this example, a normal travelling route R1 is defined such that the autonomous vehicle travels in the order from station S1, station S2, and station S3.

If no riding occupants are scheduled to get off the autonomous vehicle at the station S2 and no occupants are scheduled to get on the autonomous vehicle at the station S2, the controller 27 can be configured to change the travelling route of the corresponding autonomous vehicle from the normal travelling route R1 to another route that skips the station S2 from the station S1 to the station S3.

For example, the controller 27 can be configured to change the travelling route from the normal travelling route R1 to a selectively one of a predetermined travelling route R2 and a predetermined travelling route R3.

As illustrated in FIG. 4, the travelling route R2 has two traffic light, which is smaller than the number of traffic lights, i.e. 4, of the normal travelling route R1. This reduces the number of starts and stops of the autonomous vehicle when the autonomous vehicle travels on the travelling route R2 to be lower than the number of starts and stops of the autonomous vehicle when the autonomous vehicle travels on the travelling route R1. This reduces the number of vibrations applied to each occupant in the longitudinal direction of the autonomous vehicle due to great inertia force in the longitudinal direction of the autonomous vehicle.

The travelling route R2 is preferably selected for a case where at least one longitudinal-vibration sensitive occupant who wants to protect his/her front side and/or back side of the body thereof, such as a pregnant woman, an infant, or an occipital disease person, is riding on the autonomous vehicle.

As illustrated in FIG. 4, the travelling route R3 has a maximum steering angle, which is smaller than the maximum steering angle of the normal travelling route R1. This reduces the magnitude of each lateral vibration generated due to great inertia force in the lateral direction of the autonomous vehicle when the autonomous vehicle travels on the travelling route R3 to be smaller than the magnitude of each lateral vibration generated due to great inertia force in the lateral direction of the autonomous vehicle when the autonomous vehicle travels on the travelling route R1.

The travelling route R3 is preferably selected for a case where at least one lateral-vibration sensitive occupant who is forced to ride on the autonomous vehicle with an unstable posture, such as a leg-broken occupant.

Figure 5:
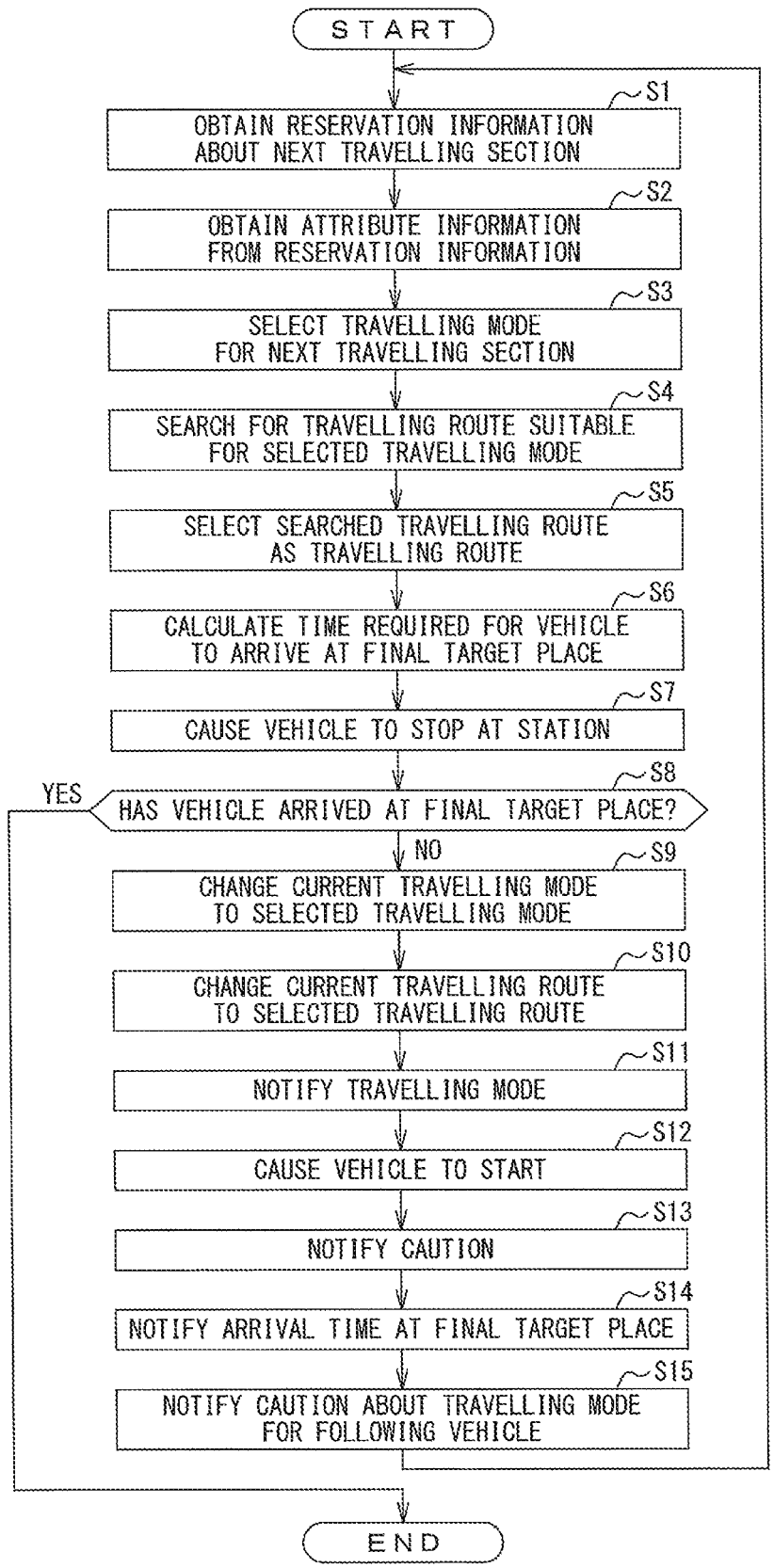
FIG. 5 is a flowchart schematically illustrating a travelling-characteristic control routine carried out by a vehicular control apparatus according to the exemplary embodiment of the present invention.

Next, the following describes a travelling-characteristic control routine carried out by the vehicular control apparatus 2 installed in each autonomous vehicle with reference to FIG. 5. Note that the vehicular control apparatus 2 installed in each autonomous vehicle is configured to execute the travelling-characteristic control routine a predetermined time before the corresponding autonomous vehicle, which is travelling on a current travelling section in a current travelling route and in a current travelling mode (N-th travelling section where N is a positive integer), arrives at the end station of the N-th travelling section.

When starting the travelling-characteristic control routine, the control unit 27 identifies, based on, for example, the information about the current position of the corresponding autonomous vehicle measured by the positional information detector 24, the next (N+1)-th travelling section located between a corresponding adjacent pair of the stations on which the corresponding autonomous vehicle is scheduled to travel in step S1.

In step S1, the controller 27 obtains, from the server 3, the reservation information about the (N+1)-th travelling section of the corresponding autonomous vehicle.

Subsequently, the controller 27 obtains, from the reservation information about the (N+1)-th travelling section of the corresponding autonomous vehicle, the attribute information about each of all the riding occupants scheduled to ride on the corresponding autonomous vehicle in the (N+1)-th travelling section in step S2.

Next, the controller 27 for example calculates, based on the attribute information about all of the riding occupants scheduled to ride on the corresponding autonomous vehicle in the (N+1)-th travelling section,
(1) The first number A, i.e. the number of one or more longitudinal-vibration sensitive occupants, riding on the corresponding autonomous vehicle in the (N+1)-th travelling section
(2) The second number B, i.e. the number of one or more lateral-vibration sensitive occupants, riding on the corresponding autonomous vehicle in the (N+1)-th travelling section
(3) The third number C, i.e. the number of one or more standing less-sensitive occupants to vibrations, riding on the corresponding autonomous vehicle in the (N+1)-th travelling section as described above in step S3.

Then, the controller 27 selects, based on, for example, the first to third numbers A to C and the map M1, one of the previously prepared travelling modes for the (N+1)-th travelling section in step S3.

In step S4, the controller 27 searches for a travelling route suitable for the selected travelling mode. For example, the controller 27 searches for the first route illustrated in FIG. 3 when the total-vibration reduction mode is selected as the travelling mode for the (N+1)-th travelling section.

Note that the controller 27 can search for an optimum travelling route based on the attribute information about each of all the riding occupants scheduled to ride on the corresponding autonomous vehicle in the next travelling section in step S4. For example, the controller 27 can search for the optimum travelling route based on the first to third numbers A to C of the riding objects and the normal condition and the first to fourth route conditions illustrated in FIG. 3.

The controller 27 can search for an optimum travelling route based on the attribute information about each of all the riding occupants scheduled to ride on the corresponding autonomous vehicle when obtaining the attribute information about each of all the riding occupants in step S2.

In step S5, the controller 27 determines the searched traveling route as the travelling route for the (N+1)-th travelling section.

Next, the controller 27 estimates, based on, for example, a current speed of the corresponding autonomous vehicle and the number of stations to the final target place (final target station), a time required for the corresponding autonomous vehicle to arrive at the final target station in step S6.

Note that the controller 27 can calculate, based on the current speed and the current position of the corresponding autonomous vehicle, a time required for the corresponding autonomous vehicle to arrive at the next station, i.e. the end station of the N-th travelling section or the start station of the (N+1)-th travelling section.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle.

Following the operation in step S6, the controller 27 controls, for example, the steering mechanism 51 and the braking mechanism 53 to thereby cause the corresponding autonomous vehicle to stop at the end station of the N-th travelling section upon determination, based on the reservation information, that at least one user, i.e. at least one reservation occupant, is scheduled to get on the corresponding autonomous vehicle at the start station, and/or at least one riding occupant on the corresponding autonomous vehicle is scheduled to get off the corresponding autonomous vehicle in step S7.

Next, the controller 27 determines whether the corresponding autonomous vehicle has arrived at the final target place, i.e. the final target station, in step S8. Upon determination that the corresponding autonomous vehicle has arrived at the final target station, i.e. the end station of the N-th travelling section is the final target station (YES in step S8), the controller 27 terminates the travelling-characteristic control routine.

Otherwise, upon determination that the corresponding autonomous vehicle has not arrived at the final target station, i.e. the end station of the N-th travelling section is not the final target station (NO in step S8), the travelling-characteristic control routine proceeds to step S9.

In step S9, the controller 27 changes the current travelling mode to the determined travelling mode for the next (N+1)-th travelling section upon the current travelling mode being different from the determined travelling mode in step S3, or continuously maintains the current travelling mode for the next (N+1)-th travelling section upon the current travelling mode being identical to the determined travelling mode in step S3.

Following the operation in step S9, the controller 27 changes the current travelling route to the selected travelling route for the next (N+1)-th travelling section upon the current travelling route being different from the selected travelling route in step S5, or continuously maintains the current travelling route for the next (N+1)-th travelling section upon the current travelling route being identical to the selected travelling route in step S10.

Next, the controller 27 causes the notifying unit 26 to notify a message that represents the travelling mode for the next (N+1)-th travelling section in step S11. For example, if the longitudinal-vibration reduction mode is selected in step S3, the controller 27 causes the notifying unit 26 to notify the following message:

"TRAVEL IN TRAVELLING MODE TO REDUCE LONGITUDINAL VIBRATIONS"

Following the operation in step S11, the controller 27 determines whether a predetermined vehicle start condition is satisfied in step S12. Upon determination that the predetermined vehicle start condition is not satisfied, the controller 27 repeatedly executes the determination in step S12.

Otherwise, upon determination that the predetermined vehicle start condition is satisfied, the controller 27 causes the notifying unit 26 to notify all the riding occupants of a message indicative of a start of the corresponding autonomous vehicle in step S12, and controls, for example, the steering mechanism 51 and the drive mechanism 52 to thereby cause the corresponding autonomous vehicle to start from the start station of the (N+1)-th travelling section in step S12.

In addition, the controller 27 causes the operating parameter controller 54 to control the operating parameters for each of the steering mechanism 51, drive mechanism 52, and braking mechanism 53 in accordance with the determined travelling mode, i.e. the selected travelling characteristics, and the determined travelling route of the corresponding autonomous vehicle set or changed by the controller 27. This enables the corresponding autonomous vehicle to travel on the determined travelling route in the determined travelling mode suitable for the (N+1)-th travelling section.

The vehicle start condition includes, for example, a condition that the number of all the reservation occupants riding on the corresponding autonomous vehicle for the (N+1)-th travelling section, which will be referred to as a reservation-occupant number for the (N+1)-th travelling section, is equal to the number of seats where the corresponding seat belts are fastened. That is, the controller 27 causes the corresponding autonomous vehicle to start from the start station of the (N+1)-th travelling section upon determination that the reservation-occupant number for the (N+1)-th travelling section is equal to the number of seats where the corresponding seat belts are fastened.

For example, the controller 27 can obtain, from the reservation information about the (N+1)-th travelling section, the reservation-occupant number for the (N+1)-th travelling section. The controller 27 also can obtain, from seat-belt sensors (not illustrated) provided for the respective seats of the corresponding autonomous vehicles, the number of seats where the corresponding seat belts are fastened.

It is preferable that the controller 27 obtain, based on the reservation information about the (N+1)-th travelling section, the wearing-nonobligatory number of one or more occupants, who have made a reservation for the (N+1)-th travelling section and are exempted from the obligation to wear the corresponding seat belts. It is also preferable that the controller 27 subtracts, from the reservation-occupant number for the (N+1)-th travelling section, the wearing-nonobligatory number to thereby calculate a corrected value of the reservation-occupant number for the (N+1)-th travelling section. Then, it is preferable that the controller 27 compares the corrected value of the reservation-occupant number for the (N+1)-th travelling section with the number of seats where the corresponding seat belts are fastened. This therefore makes it possible to cause the corresponding autonomous vehicle to start the corresponding autonomous vehicle even if one or more riding occupant, who cannot wear their seat belts, are not wearing their seat belts.

In step S13, the controller 27 causes the notifying unit 26 to notify all the riding occupants of a message including cautions in the determined travelling mode for the (N+1)-th travelling section. For example, the controller 27 causes the notifying unit 26 to notify the following message:

"THIS VEHICLE IS TRAVELLING SLOWLY" and/or "ARRIVAL OF OUR VEHICLE AT FINAL TARGET PLACE WILL BE DELAYED"

Following the operation in step S13, the controller 27 estimates, based on, for example, a current speed of the corresponding autonomous vehicle and the number of stations to the final target place (final target station), a time required for the corresponding autonomous vehicle to arrive at the final target station in step S14. Then, the controller 27 causes the notifying unit 26 to inform all the riding occupants of the estimated time required for the corresponding autonomous vehicle to arrive at the final target station in step S14

Note that the controller 27 can calculate, based on the current speed and the current position of the corresponding autonomous vehicle, a time required for the corresponding autonomous vehicle to arrive at the next station, i.e. the end station of the (N+1)-th travelling section or the start station of the (N+2)-th travelling section in step S14. Then, the controller 27 causes the notifying unit 26 to inform all the riding occupants of the estimated time required for the corresponding autonomous vehicle to arrive at the next station in step S14.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle in step S14. Then, the controller 27 causes the notifying unit 26 to inform all the riding occupants of the calculate time required for the corresponding autonomous vehicle to arrive at the specified station in step S14.

Next, the controller 27 causes the notifying unit 26 to notify, through its liquid crystal display device located outside the body of the corresponding autonomous vehicle, a message including cautions in the determined travelling mode for the (N+1)-th travelling section for the following autonomous vehicle in step S15. For example, the controller 27 causes the notifying unit 26 to notify, through its liquid crystal display device located outside the body of the corresponding autonomous vehicle, the following message:

"THIS VEHICLE WILL START OR STOP SLOWLY BECAUSE PREGNANT IS RIDING ON THIS VEHICLE"

After the operation in step S15, the controller 27 returns to step S1, and repeats the operations in steps S1 to S15 each time N is incremented by 1.

As described above, the vehicular control apparatus 2 installed in each autonomous vehicle, which is travelling on a current travelling section of a travelling route, according to the exemplary embodiment is configured to obtain, from the reservation information about each of one or more occupants for the next travelling section, the attribute information about the corresponding one of the one or more occupants.

Then, the vehicular control apparatus 2 is configured to select one of the prepared travelling modes as a travelling mode for the next travelling section in accordance with the attribute information about each of the one or more occupants riding on the corresponding autonomous vehicle. The vehicular control apparatus 2 is configured to change the current travelling mode to the selected travelling mode for the next travelling section before starting travel of the corresponding autonomous vehicle on the next travelling section.

This configuration of the vehicular control apparatus 2 enables the corresponding autonomous vehicle to start travelling on the next travelling section suitable for the attribute information about each of the one or more riding occupants, making it possible to increase the safety of each of the one or more riding occupants.

For example, if a specific occupant who is sensitive to vibrations, such as a pregnant, is included in the one or more riding occupants, the vehicular control apparatus 2 reliably recognizes, based on the attribute information about the specific occupant, that the specific occupant is sensitive to vibrations, and causes the corresponding autonomous vehicle to travel more slowly as compared with a case where specific occupants sensitive to vibrations are not included in the one or more riding occupants. This increases the safety of the specific occupant.

The vehicular control apparatus 2 is configured to search for a travelling route for the next travelling section, which is suitable for the selected travelling mode, and change a current travelling route to the searched travelling route for the next travelling section before starting travel of the corresponding autonomous vehicle on the next travelling section.

Even if a specific occupant who is sensitive to vibrations, such as a pregnant, is included in the one or more riding occupants, this configuration enables the vehicular control apparatus 2 to select, as the travelling route for the next travelling section, a travelling route that has a smaller number of starts and stops and/or a smaller number of right-and-left turns as compared with the corresponding autonomous vehicle travelling in a normal travelling route.

Specifically, this configuration enables the vehicular control apparatus 2 to select, as the travelling route for the next travelling section, a travelling route that has a smaller number of traffic signs and a smaller number of turns of the corresponding autonomous vehicle as compared with the corresponding autonomous vehicle travelling in a normal travelling route. This therefore further increases the safety of the specific occupant.

As described above, the vehicular control apparatus 2 changes or sets the current travelling route to the searched travelling route for the next travelling section before starting travel of the corresponding autonomous vehicle on the next travelling section.

This enables the corresponding autonomous vehicle to travel on the searched travelling route suitable for the selected travelling mode immediately after starting travel of the corresponding autonomous vehicle. This therefore makes it possible for the corresponding autonomous vehicle to travel on the searched travelling route that has a smaller number of traffic signs and a smaller number of turns of the corresponding autonomous vehicle, resulting in further increase in the safety of one or more riding occupants, each of who has a specific attribute.

The vehicular control apparatus 2 installed in each autonomous vehicle according to the exemplary embodiment can be configured as a modification to (1) Regularly obtain the reservation information about each of one or more riding occupants for each travelling section while the corresponding autonomous vehicle is travelling on the current travelling route to thereby determine whether, during travel of the current travelling section of the corresponding autonomous vehicle, the obtained reservation information for the next travelling section has been changed to be different from the reservation information for the current next travelling section (2) Execute the operations in steps S2 to S7 each time the obtained reservation information for the next travelling section has been changed to be different from the reservation information for the current next travelling section This modification enables the vehicular control apparatus to determine a travelling route mode and/or a travelling route for the next travelling section in accordance with the newest reservation information for the next travelling section during the corresponding autonomous vehicle stopping at the start station of the next travelling section. This therefore results in a further increase in the safety of one or more riding occupants, each of who has a specific attribute.

If it is difficult to determine whether, during travel of the current travelling section of the corresponding autonomous vehicle, the obtained reservation information for the next travelling section has been changed to be different from the reservation information for the current next travelling section, the vehicular control apparatus 2 can be configured to regularly execute the operations in steps S1 to S7 while the corresponding autonomous vehicle is travelling on the current travelling route, which is different from the above modification. This configuration obtains the same effects as those obtained by the above modification.

The vehicular control apparatus 2 installed in an autonomous vehicle according to the exemplary embodiment is configured to notify one or more riding occupants of information representing that the current travelling mode, i.e. the current travelling characteristics, for the current travelling section has been changed or reset to a selected travelling mode, i.e. selected travelling characteristics, for the next travelling section in step S11. This configuration enables each of the one or more riding occupants to know the changing or resetting of the selected travelling mode, i.e. selected travelling characteristics, for the next travelling section. This therefore enables each of the one or more riding occupants, especially one or more occupants who are continuously riding in several travelling sections, to understand that the cause of their uncomfortable feeling and/or anxious feeling is changing or resetting of the travelling mode of the corresponding autonomous vehicle. This gives a sense of safety to the one or more riding occupants, that is, reduces anxious feeling of the one or more riding occupants.

The vehicular control apparatus 2 installed in an autonomous vehicle according to the exemplary embodiment is configured to notify one or more riding occupants of information including cautions in the changed travelling mode in step S13 in addition to notifying changing of the travelling mode. This therefore reduces uncomfortable feeling and/or anxious feeling of the one or more riding occupants, especially one or more less-sensitive occupants to vibrations.

The vehicular control apparatus 2 can be configured to perform the operation in step S13 simultaneously with notifying the changing of the travelling mode in step S11, thus providing an opportunity for one or more occupants to get off the corresponding autonomous vehicle. This makes it convenient for the one or more riding occupants to have an intention to go to the final target place using another means of transportation if arrival of the corresponding autonomous vehicle at the final target place is likely to be delayed.

The vehicular control apparatus 2 can be configured to perform the operation in step S14 simultaneously with notifying the changing of the travelling mode in step S11, making it possible to provide an opportunity for one or more occupants to get off the corresponding autonomous vehicle. This makes it convenient for the one or more riding occupants to have an intention to go to the final target place using another means of transportation if it takes long time for the corresponding autonomous vehicle to arrive at the final target place.

The controller 27 of the vehicular control apparatus 2 is configured to (1) Estimate a time required for the corresponding autonomous vehicle to arrive at the final target station
(2) Cause the notifying unit 26 to inform one or more riding occupants of the estimated time required for the corresponding autonomous vehicle to arrive at the final target station This configuration enables each of the one or more riding occupants to recognize whether the estimated time required for the corresponding autonomous vehicle to arrive at the final target station is changed from a predetermined originally scheduled arrival time due to change of the travelling mode, i.e. travelling characteristics of the corresponding autonomous vehicle. This therefore prevents the one or more occupants from having anxiety or impatience, such as whether the corresponding autonomous vehicle arrives at the final target place as scheduled although the corresponding autonomous vehicle is travelling slowly or how long arrival of the corresponding autonomous vehicle at the final target place is delayed as compared with the originally scheduled arrival time.

The vehicular control apparatus 2 installed in an autonomous vehicle causes the notifying unit 26 to output, around the corresponding autonomous vehicle, information about changing of the travelling mode, making it possible for other persons, especially occupants in the following autonomous vehicle, located around the corresponding autonomous vehicle to recognize the changed travelling mode of the corresponding autonomous vehicle.

This therefore enables each of the one or more other persons located around the corresponding autonomous vehicle to understand that the cause of their uncomfortable feeling and/or anxious feeling is changing or resetting of the travelling mode of the corresponding autonomous vehicle. This gives a sense of safety to the other persons located around the corresponding autonomous vehicle.

First Modification of Exemplary Embodiment

The following describes a driverless operation system 1 that is configured as a non-reservation autonomous-bus driverless operation system according to a first modification of the exemplary embodiment.

The vehicular control apparatus 2 installed in each autonomous vehicle, which is travelling on a current travelling section of a travelling route, according to the exemplary embodiment is configured to obtain, from the reservation information about each of one or more occupants for the next travelling section, the attribute information about the corresponding one of the one or more occupants.

In contrast, the occupant information obtaining unit 21 of the vehicular control apparatus 2 installed in each autonomous vehicle, which is travelling on a current travelling section of a travelling route, according to the first modification of the exemplary embodiment is configured to obtain, each time an occupant rides on the corresponding autonomous vehicle, identification information for identifying the attribute information about the occupant. The controller 27 is configured to identify the attribute information about the occupant based on the identification information about the occupant.

The controller 27 sets the travelling characteristics of the next travelling section in accordance with the attribute information about at least one riding occupant who rides on the corresponding autonomous vehicle at the start station of the next travelling section, and the attribute information about the at least one riding occupant before starting travel of the corresponding autonomous vehicle.

Like the exemplary embodiment, the controller 27 for example calculates the number of one or more longitudinal-vibration sensitive occupants, i.e. the first number A, the number of one or more lateral-vibration sensitive occupants, i.e. the second number B, and the number of one or more standing less-sensitive occupants to vibrations, i.e. the third number C, in accordance with 1. The attribute information about each of all the riding occupants on the corresponding autonomous vehicle in the next travelling section
2. The number of all seats in the corresponding autonomous vehicle After calculation of the first number A, second number B, and third number C, the controller 27 selectively determines the travelling mode of the corresponding autonomous vehicle to one of previously prepared travelling modes based on the map M1 for example stored therein, which illustrated in FIG. 2. This sets the travelling characteristics of the corresponding autonomous vehicle in accordance with the determined travelling mode.

The controller 27 can be configured to search for a suitable traveling route in the next travelling section in accordance with the attribute information about each of all the riding occupants on the corresponding autonomous vehicle in the next travelling section, and change a predetermined normal route in the next travelling section to the suitable travelling route.

In particular, the controller 27 can be configured to search for a suitable travelling route using a departure station and a target station of the next travelling section as a search condition, or select one of previously prepared travelling routes as the suitable travelling route.

Figure 6:
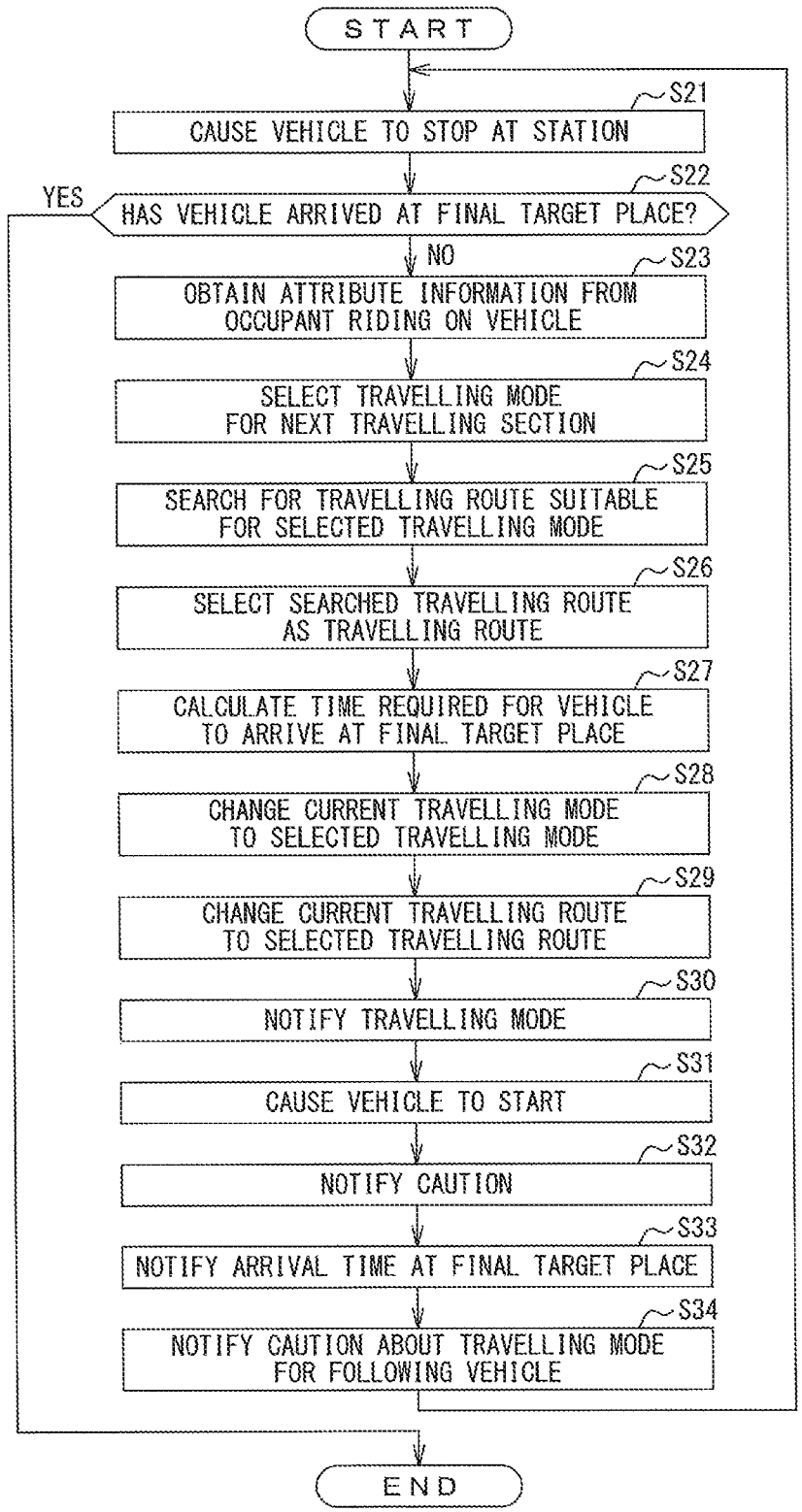
FIG. 6 is a flowchart schematically illustrating a travelling-characteristic control routine carried out by a vehicular control apparatus according to a first modification of the exemplary embodiment of the present invention.

Next, the following describes a travelling-characteristic control routine carried out by the vehicular control apparatus 2 installed in each autonomous vehicle according to the first modification of the exemplary embodiment with reference to FIG. 6 Note that the vehicular control apparatus 2 installed in each autonomous vehicle is configured to execute the travelling-characteristic control routine a predetermined time before the corresponding autonomous vehicle, which is travelling on a current travelling section in a current travelling route and in a current travelling mode (N-th travelling section where N is a positive integer), arrives at the end station of the N-th travelling section.

In step S21, the controller 27 controls, for example, the steering mechanism 51 and the braking mechanism 53 to thereby cause the corresponding autonomous vehicle to stop at the end station of the N-th travelling section.

Next, the controller 27 determines whether the corresponding autonomous vehicle has arrived at the final target place, i.e. the final target station, in step S22. Upon determination that the corresponding autonomous vehicle has arrived at the final target station, i.e. the end station of the N-th travelling section is the final target station (YES in step S22), the controller 27 terminates the travelling-characteristic control routine.

Otherwise, upon determination that the corresponding autonomous vehicle has not arrived at the final target station, i.e. the end station of the N-th travelling section, i.e. the start station of the (N+1)-th travelling section, is not the final target station (NO in step S22), the travelling-characteristic control routine proceeds to step S23.

In step S23, the controller 27 obtain, each time an occupant rides on the corresponding autonomous vehicle at the start station of the (N+1)-th travelling section, the identification information for identifying the attribute information about the occupant using the occupant information obtaining unit 21.

Next, the controller 27 for example selects, based on the map M1 and the attribute information about all of the riding occupants riding on the corresponding autonomous vehicle in the (N+1)-th travelling section, one of the previously prepared travelling modes for the (N+1)-th travelling section in step S24.

In step S25, the controller 27 searches for a travelling route suitable for the selected travelling mode.

In step S26, the controller 27 determines the searched traveling route as the travelling route for the (N+1)-th travelling section.

Next, the controller 27 estimates, based on, for example, a current speed of the corresponding autonomous vehicle and the number of stations to the final target place (final target station), a time required for the corresponding autonomous vehicle to arrive at the final target station in step S27.

Note that the controller 27 can calculate, based on the current speed and the current position of the corresponding autonomous vehicle, a time required for the corresponding autonomous vehicle to arrive at the next station, i.e. the end station of the N-th travelling section or the start station of the (N+1)-th travelling section.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle.

In step S28, the controller 27 changes the current travelling mode to the determined travelling mode for the next (N+1)-th travelling section upon the current travelling mode being different from the determined travelling mode in step S24, or continuously maintains the current travelling mode for the next (N+1)-th travelling section upon the current travelling mode being identical to the determined travelling mode in step S24.

Following the operation in step S28, the controller 27 changes the current travelling route to the selected travelling route for the next (N+1)-th travelling section upon the current travelling route being different from the selected travelling route in step S26, or continuously maintains the current travelling route for the next (N+1)-th travelling section upon the current travelling route being identical to the selected travelling route in step S29.

Next, the controller 27 causes the notifying unit 26 to notify a message that represents the travelling mode for the next (N+1)-th travelling section in step S30.

Following the operation in step S30, the controller 27 determines whether the predetermined vehicle start condition is satisfied in step S31. Upon determination that the predetermined vehicle start condition is not satisfied, the controller 27 repeatedly executes the determination in step S31.

Otherwise, upon determination that the predetermined vehicle start condition is satisfied, the controller 27 causes the notifying unit 26 to notify all the riding occupants of a message indicative of a start of the corresponding autonomous vehicle in step S31, and controls, for example, the steering mechanism 51 and the drive mechanism 52 to thereby cause the corresponding autonomous vehicle to start from the start station of the (N+1)-th travelling section in step S31.

In step S32, the controller 27 causes the notifying unit 26 to notify all the riding occupants of a message including cautions in the determined travelling mode for the (N+1)-th travelling section. For example, the controller 27 causes the notifying unit 26 to notify the following message:

"THIS VEHICLE IS TRAVELLING SLOWLY" and/or "ARRIVAL OF OUR VEHICLE AT FINAL TARGET PLACE WILL BE DELAYED"

Following the operation in step S32, the controller 27 estimates, based on, for example, a current speed of the corresponding autonomous vehicle and the number of stations to the final target place (final target station), a time required for the corresponding autonomous vehicle to arrive at the final target station in step S33. Then, the controller 27 causes the notifying unit 26 to inform all the riding occupants of the estimated time required for the corresponding autonomous vehicle to arrive at the final target station in step S33.

Note that the controller 27 can calculate, based on the current speed and the current position of the corresponding autonomous vehicle, a time required for the corresponding autonomous vehicle to arrive at the next station, i.e. the end station of the (N+1)-th travelling section or the start station of the (N+2)-th travelling section in step S33. Then, the controller 27 causes the notifying unit 26 to inform all the riding occupants of the estimated time required for the corresponding autonomous vehicle to arrive at the next station in step S33.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle in step S33. Then, the controller 27 causes the notifying unit 26 to inform all the riding occupants of the calculate time required for the corresponding autonomous vehicle to arrive at the specified station in step S33.

Next, the controller 27 causes the notifying unit 26 to notify, through its liquid crystal display device located outside the body of the corresponding autonomous vehicle, a message including cautions in the determined travelling mode for the (N+1)-th travelling section for the following autonomous vehicle in step S34. For example, the controller 27 causes the notifying unit 26 to notify, through its liquid crystal display device located outside the body of the corresponding autonomous vehicle, the following message:

"THIS VEHICLE WILL START OR STOP SLOWLY BECAUSE PREGNANT IS RIDING ON THIS VEHICLE"

After the operation in step S34, the controller 27 returns to step S21, and repeats the operations in steps S21 to S34 each time N is incremented by 1.

As described above, the vehicular control apparatus 2 installed in each autonomous vehicle, which is travelling on a current travelling section of a travelling route, according to the first modification of the exemplary embodiment is configured to obtain, from each of one or more occupants who rises on the corresponding autonomous vehicle, the attribute information about the corresponding one of the one or more occupants, using the occupant information obtaining unit 21.

Then, the vehicular control apparatus 2 is configured to select one of the prepared travelling modes as a travelling mode for the next travelling section in accordance with the attribute information about each of the one or more occupants riding on the corresponding autonomous vehicle. The vehicular control apparatus 2 is configured to change the current travelling mode to the selected travelling mode for the next travelling section before starting travel of the corresponding autonomous vehicle on the next travelling section.

This configuration of the vehicular control apparatus 2 enables the corresponding non-reservation driverless autonomous bus to start travelling on the next travelling section suitable for the attribute information about each of the one or more riding occupants, making it possible to increase the safety of each of the one or more riding occupants.

For example, if a specific occupant who is sensitive to vibrations, such as a pregnant, is included in the one or more riding occupants, the vehicular control apparatus 2 reliably recognizes, based on the attribute information about the specific occupant, that the specific occupant is sensitive to vibrations, and causes the corresponding autonomous vehicle to travel more slowly as compared with a case where specific occupants sensitive to vibrations are not included in the one or more riding occupants. This increases the safety of the specific occupant.

The vehicular control apparatus 2 is configured to search for a travelling route for the next travelling section, which is suitable for the selected travelling mode, and change a current travelling route to the searched travelling route for the next travelling section before starting travel of the corresponding autonomous vehicle on the next travelling section.

Even if a specific occupant who is sensitive to vibrations, such as a pregnant, is included in the one or more riding occupants, this configuration enables the vehicular control apparatus 2 to select, as the travelling route for the next travelling section, a travelling route that has a smaller number of starts and stops and/or a smaller number of right-and-left turns as compared with the corresponding autonomous vehicle travelling in a normal travelling route.

Specifically, this configuration enables the vehicular control apparatus 2 to select, as the travelling route for the next travelling section, a travelling route that has a smaller number of traffic signs and a smaller number of turns of the corresponding autonomous vehicle as compared with the corresponding autonomous vehicle travelling in a normal travelling route. This therefore further increases the safety of the specific occupant.

As described above, the vehicular control apparatus 2 changes or sets the current travelling route to the searched travelling route for the next travelling section before starting travel of the corresponding autonomous vehicle on the next travelling section.

This enables the corresponding autonomous vehicle to travel on the searched travelling route suitable for the selected travelling mode immediately after starting travel of the corresponding autonomous vehicle. This therefore makes it possible for the corresponding autonomous vehicle to travel on the searched travelling route that has a smaller number of traffic signs and a smaller number of turns of the corresponding autonomous vehicle, resulting in further increase in the safety of one or more riding occupants, each of who has a specific attribute.

Second Modification of Exemplary Embodiment

The following describes a driverless operation system 1 configured as an autonomous-bus driverless operation system that enables both users with reservation and users without reservation to take a selected autonomous vehicle as occupants according to a second modification of the exemplary embodiment.

Referring to FIG. 1, the occupant information obtaining unit 21 of the vehicular control apparatus 2 installed in each autonomous vehicle, which is travelling on a current travelling section of a travelling route, is configured to obtain, each time an occupant, i.e. a non-reservation occupant, rides on the corresponding autonomous vehicle, identification information for identifying the attribute information about the occupant. The controller 27 is configured to identify the attribute information about the occupant based on the identification information about the occupant.

The controller 27 determines whether there is at least one empty seat in the corresponding autonomous vehicle based on the reservation information about all of the riding occupants on the corresponding autonomous vehicle and the number of seats in the corresponding autonomous vehicle. The controller 27 causes the notifying unit 26 to notify, through its liquid crystal display device located outside the body of the corresponding autonomous vehicle, information representing that there is at least one empty seat in the corresponding autonomous vehicle.

The controller 27 sets the travelling characteristics of the next travelling section before starting travel of the corresponding autonomous vehicle in accordance with 1. The attribute information about at least one riding non-reservation occupant who rides on the corresponding autonomous vehicle at the start station of the next travelling section, which is obtained by the occupant information obtaining unit 21
2. The attribute information about the at least one riding reservation occupant, which is obtained from the reservation information Like the exemplary embodiment, the controller 27 for example calculates the number of one or more longitudinal-vibration sensitive occupants, i.e. the first number A, the number of one or more lateral-vibration sensitive occupants, i.e. the second number B, and the number of one or more standing less-sensitive occupants to vibrations, i.e. the third number C, in accordance with 1. The attribute information about each of all the riding occupants on the corresponding autonomous vehicle in the next travelling section
2. The number of all seats in the corresponding autonomous vehicle After calculation of the first number A, second number B, and third number C, the controller 27 selectively determines the travelling mode of the corresponding autonomous vehicle to one of previously prepared travelling modes based on the map M1 for example stored therein, which illustrated in FIG. 2. This sets the travelling characteristics of the corresponding autonomous vehicle in accordance with the determined travelling mode.

The controller 27 can be configured to search for a suitable traveling route in the next travelling section in accordance with the attribute information about each of all the riding occupants on the corresponding autonomous vehicle in the next travelling section, and change a predetermined normal route in the next travelling section to the suitable travelling route.

In particular, the controller 27 can be configured to search for a suitable travelling route using a departure station and a target station of the next travelling section as a search condition, or select one of previously prepared travelling routes as the suitable travelling route.

Figure 7:
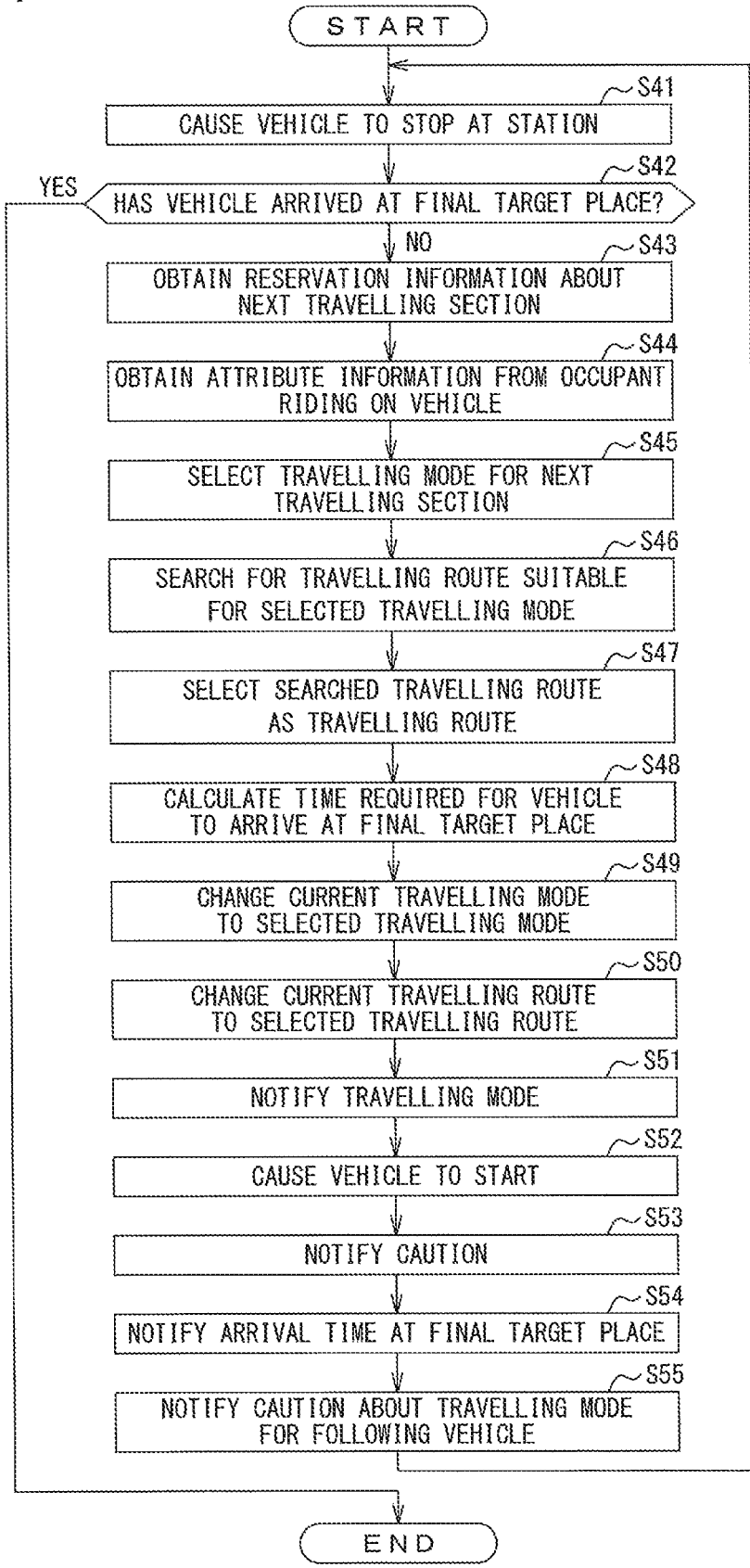
FIG. 7 is a flowchart schematically illustrating a travelling-characteristic control routine carried out by a vehicular control apparatus according to a second modification of the exemplary embodiment of the present invention.

Next, the following describes a travelling-characteristic control routine carried out by the vehicular control apparatus 2 installed in each autonomous vehicle according to the second modification of the exemplary embodiment with reference to FIG. 7 Note that the vehicular control apparatus 2 installed in each autonomous vehicle is configured to execute the travelling-characteristic control routine a predetermined time before the corresponding autonomous vehicle, which is travelling on a current travelling section in a current travelling route and in a current travelling mode (N-th travelling section where N is a positive integer), arrives at the end station of the N-th travelling section.

In step S41, the controller 27 controls, for example, the steering mechanism 51 and the braking mechanism 53 to thereby cause the corresponding autonomous vehicle to stop at the end station of the N-th travelling section.

Next, the controller 27 determines whether the corresponding autonomous vehicle has arrived at the final target place, i.e. the final target station, in step S42. Upon determination that the corresponding autonomous vehicle has arrived at the final target station, i.e. the end station of the N-th travelling section is the final target station (YES in step S42), the controller 27 terminates the travelling-characteristic control routine.

Otherwise, upon determination that the corresponding autonomous vehicle has not arrived at the final target station, i.e. the end station of the N-th travelling section, i.e. the start station of the (N+1)-th travelling section, is not the final target station (NO in step S42), the travelling-characteristic control routine proceeds to step S43.

In step S43, the controller 27 obtains, from the server 3, the reservation information about the (N+1)-th travelling section of the corresponding autonomous vehicle.

In step S44, the controller 27 obtain, each time an occupant rides on the corresponding autonomous vehicle at the start station of the (N+1)-th travelling section, the identification information for identifying the attribute information about the occupant using the occupant information obtaining unit 21.

Next, the controller 27 for example selects, based on the map M1 and the attribute information about all of the riding occupants riding on the corresponding autonomous vehicle in the (N+1)-th travelling section, one of the previously prepared travelling modes for the (N+1)-th travelling section in step S45.

In step S46, the controller 27 searches for a travelling route suitable for the selected travelling mode.

In step S47, the controller 27 determines the searched traveling route as the travelling route for the (N+1)-th travelling section.

Next, the controller 27 estimates, based on, for example, a current speed of the corresponding autonomous vehicle and the number of stations to the final target place (final target station), a time required for the corresponding autonomous vehicle to arrive at the final target station in step S48.

Note that the controller 27 can calculate, based on the current speed and the current position of the corresponding autonomous vehicle, a time required for the corresponding autonomous vehicle to arrive at the next station, i.e. the end station of the N-th travelling section or the start station of the (N+1)-th travelling section.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle.

In step S49, the controller 27 changes the current travelling mode to the determined travelling mode for the next (N+1)-th travelling section upon the current travelling mode being different from the determined travelling mode in step S45, or continuously maintains the current travelling mode for the next (N+1)-th travelling section upon the current travelling mode being identical to the determined travelling mode in step S45.

Following the operation in step S49, the controller 27 changes the current travelling route to the selected travelling route for the next (N+1)-th travelling section upon the current travelling route being different from the selected travelling route in step S47, or continuously maintains the current travelling route for the next (N+1)-th travelling section upon the current travelling route being identical to the selected travelling route in step S50.

Next, the controller 27 causes the notifying unit 26 to notify a message that represents the travelling mode for the next (N+1)-th travelling section in step S51.

Following the operation in step S51, the controller 27 determines whether the predetermined vehicle start condition is satisfied in step S52. Upon determination that the predetermined vehicle start condition is not satisfied, the controller 27 repeatedly executes the determination in step S52.

Otherwise, upon determination that the predetermined vehicle start condition is satisfied, the controller 27 causes the notifying unit 26 to notify all the riding occupants of a message indicative of a start of the corresponding autonomous vehicle in step S52, and controls, for example, the steering mechanism 51 and the drive mechanism 52 to thereby cause the corresponding autonomous vehicle to start from the start station of the (N+1)-th travelling section in step S52.

In step S53, the controller 27 causes the notifying unit 26 to notify all the riding occupants of a message including cautions in the determined travelling mode for the (N+1)-th travelling section. For example, the controller 27 causes the notifying unit 26 to notify the following message:

"THIS VEHICLE IS TRAVELLING SLOWLY" and/or "ARRIVAL OF OUR VEHICLE AT FINAL TARGET PLACE WILL BE DELAYED"

Following the operation in step S53, the controller 27 estimates, based on, for example, a current speed of the corresponding autonomous vehicle and the number of stations to the final target place (final target station), a time required for the corresponding autonomous vehicle to arrive at the final target station in step S54. Then, the controller 27 causes the notifying unit 26 to inform all the riding occupants of the estimated time required for the corresponding autonomous vehicle to arrive at the final target station in step S54.

Note that the controller 27 can calculate, based on the current speed and the current position of the corresponding autonomous vehicle, a time required for the corresponding autonomous vehicle to arrive at the next station, i.e. the end station of the (N+1)-th travelling section or the start station of the (N+2)-th travelling section in step S54. Then, the controller 27 causes the notifying unit 26 to inform all the riding occupants of the estimated time required for the corresponding autonomous vehicle to arrive at the next station in step S54.

In addition, the controller 27 can calculate, based on the current speed and the attribute information about each of one or more less-sensitive occupants to vibrations, a time required for the corresponding autonomous vehicle to arrive at a specified station where no less-sensitive occupants to vibrations are riding on the corresponding autonomous vehicle in step S54. Then, the controller 27 causes the notifying unit 26 to inform all the riding occupants of the calculate time required for the corresponding autonomous vehicle to arrive at the specified station in step S54.

Next, the controller 27 causes the notifying unit 26 to notify, through its liquid crystal display device located outside the body of the corresponding autonomous vehicle, a message including cautions in the determined travelling mode for the (N+1)-th travelling section for the following autonomous vehicle in step S55. For example, the controller 27 causes the notifying unit 26 to notify, through its liquid crystal display device located outside the body of the corresponding autonomous vehicle, the following message:

"THIS VEHICLE WILL START OR STOP SLOWLY BECAUSE PREGNANT IS RIDING ON THIS VEHICLE"

After the operation in step S55, the controller 27 returns to step S41, and repeats the operations in steps S41 to S55 each time N is incremented by 1.

As described above, the vehicular control apparatus 2 installed in each autonomous vehicle, which is travelling on a current travelling section of a travelling route, according to the second modification of the exemplary embodiment is configured to
1. Obtain, from the reservation information about each of one or more reservation occupants for the next travelling section, the attribute information about the corresponding one of the one or more occupants
2. Obtain, from each of one or more non-reservation occupants who rises on the corresponding autonomous vehicle without reservation, the attribute information about the corresponding one of the one or more occupants, using the occupant information obtaining unit 21.

Then, the vehicular control apparatus 2 is configured to select one of the prepared travelling modes as a travelling mode for the next travelling section in accordance with the attribute information about each of the one or more occupants riding on the corresponding autonomous vehicle. The vehicular control apparatus 2 is configured to change the current travelling mode to the selected travelling mode for the next travelling section before starting travel of the corresponding autonomous vehicle on the next travelling section.

This configuration of the vehicular control apparatus 2 enables the corresponding non-reservation driverless autonomous bus to start travelling on the next travelling section suitable for the attribute information about each of the one or more riding occupants, making it possible to increase the safety of each of the one or more riding occupants.

For example, if a specific occupant who is sensitive to vibrations, such as a pregnant, is included in the one or more riding occupants, the vehicular control apparatus 2 reliably recognizes, based on the attribute information about the specific occupant, that the specific occupant is sensitive to vibrations, and causes the corresponding autonomous vehicle to travel more slowly as compared with a case where specific occupants sensitive to vibrations are not included in the one or more riding occupants. This increases the safety of the specific occupant.

The vehicular control apparatus 2 is configured to search for a travelling route for the next travelling section, which is suitable for the selected travelling mode, and change a current travelling route to the searched travelling route for the next travelling section before starting travel of the corresponding autonomous vehicle on the next travelling section.

Even if a specific occupant who is sensitive to vibrations, such as a pregnant, is included in the one or more riding occupants, this configuration enables the vehicular control apparatus 2 to select, as the travelling route for the next travelling section, a travelling route that has a smaller number of starts and stops and/or a smaller number of right-and-left turns as compared with the corresponding autonomous vehicle travelling in a normal travelling route.

Specifically, this configuration enables the vehicular control apparatus 2 to select, as the travelling route for the next travelling section, a travelling route that has a smaller number of traffic signs and a smaller number of turns of the corresponding autonomous vehicle as compared with the corresponding autonomous vehicle travelling in a normal travelling route. This therefore further increases the safety of the specific occupant.

As described above, the vehicular control apparatus 2 changes or sets the current travelling route to the searched travelling route for the next travelling section before starting travel of the corresponding autonomous vehicle on the next travelling section.

This enables the corresponding autonomous vehicle to travel on the searched travelling route suitable for the selected travelling mode immediately after starting travel of the corresponding autonomous vehicle. This therefore makes it possible for the corresponding autonomous vehicle to travel on the searched travelling route that has a smaller number of traffic signs and a smaller number of turns of the corresponding autonomous vehicle, resulting in further increase in the safety of one or more riding occupants, each of who has a specific attribute.

The vehicular control apparatus 2 of the exemplary embodiment is applied to the driverless operation system, but a vehicular control apparatus of the present invention can be applied to a driver operation system, such as a taxi operation system, in which a seat reservation can be made, or a driver operation system, such as a taxi operation system, in which occupant information about each occupant can be obtained. If the vehicular control apparatus 2 of the exemplary embodiment is applied to such a driver operation system, the next travelling section can be defined as a travelling section from a place where a next occupant rises on a corresponding autonomous vehicle to a target place where the next occupant gets off the corresponding autonomous vehicle.

The vehicular control apparatus 2 of the exemplary embodiment includes a control feature that is capable of obtaining the attribute information about one or more occupants who ride on the corresponding autonomous vehicle from occupant information about each of the one or more occupants, and setting a travelling route based on the attribute information about each of the one or more occupants. This control feature of the vehicular control apparatus 2 can be applied to a first vehicle in which its travelling characteristics of the vehicle cannot be set or to a second vehicle in which its travelling characteristics cannot be changed.

This application makes it possible to cause each of the first and second vehicles to travel on a selected travelling route with a higher safety of each occupant, resulting in an increase in the safety of each occupant.

The control feature set forth above can also be applied to an in-vehicle apparatus, such as a car navigation apparatus, installed in a vehicle, or a portable travelling route setting device including an information, such as a cellular phone or a smart phone, which is useable in a vehicle. When the control feature set forth above is applied to such an in-vehicle apparatus or a portable travelling route setting device, the in-vehicle apparatus or portable travelling route setting device is preferably configured to transmit or receive various information, such as the attribute information about each occupant to or from the server 3 and/or the occupant information obtaining unit 21 installed in the vehicle.

In particular, if the control feature set forth above is applied to a driver taxi system a seat reservation can be made, there is a possibility that the above in-vehicle device is not installed in a vehicle. From this viewpoint, the control feature according to the exemplary embodiment is preferably applied to such a travelling-route setting device carried by a driver of the vehicle, such as a smart phone capable of displaying map information and searching for a travelling route.

For example, it is possible to install, in a mobile terminal carried by a driver, a function of displaying map information, and a function of searching for a travelling route. That is, the mobile terminal can be configured to search for a travelling route based on the attribute information about each occupant, which has been stored in the mobile terminal or inputted to the mobile terminal by itself or together with a server communicable with the mobile terminal.

The controller 27 of each of the exemplary embodiment and its first and second modifications is configured to perform various determination tasks and/or calculation tasks in accordance with various pieces of sensor information obtained by the above components 21 to 24 and/or various sensors, but the present invention is not limited thereto. Specifically, at least one outside device located outside the corresponding autonomous vehicle can be configured to perform various determination tasks and/or calculation tasks in accordance with various pieces of sensor information obtained by the above components 21 to 24 and/or various sensors sent from the communication unit 25. Then, the controller 27 can be configured to receive the results of the determination tasks and/or calculation tasks received from the at least one outside device via the communication unit 25, and perform various control tasks of, for example, the components 51 to 53 in accordance with the received results of the determination tasks and/or calculation tasks.

The exemplary embodiment and its first and second modifications of the present invention have been disclosed. It is evident that skilled persons in the art can modify each of the exemplary embodiment and its first and second modifications without deviating from the scope of the present invention. All the modified or equivalent matters are meant to be included in the following claims.

REFERENCE SIGNS LIST

1 Driverless operation system
2 Vehicular control apparatus
3 Server
21 Occupant information obtaining unit
25 Communication unit
26 Notifying unit
27 Controller
32 Information manager
33 Communication device

The invention claimed is:

1. A vehicle control apparatus comprising:
a controller for controlling a travelling of a vehicle,
the controller being configured to:
  obtain attribute information about at least one occupant except for a driver from reservation information or from information about the at least one occupant who rides on the vehicle, the reservation information including information about the at least one occupant who has made a reservation for the vehicle, the obtained attribute information about the at least one occupant representing at least one of types of sensitivity of the at least one occupant to a vibration; and
  set a travelling characteristic of the vehicle based on the obtained attribute information about at least one occupant,
the vehicle being scheduled to travel on a plurality of travelling sections with a station on a service route to a target station, the at least one occupant comprising a plurality of occupants, at least one of the plurality of occupants riding on the vehicle for each of the travelling sections,
wherein the controller is configured to:
  set, for each of the travelling sections, the travelling characteristic of the vehicle based on the obtained attribute information about the at least one of the plurality of occupants riding on the vehicle for the corresponding one of the travelling sections; and
  notify, if it changes, for the next travelling section, the set travelling characteristic, a message about the changed travelling characteristic for the next travelling section before starting travel of the vehicle at the next travelling section.

2. The vehicle control apparatus according to claim 1, wherein:
the controller is configured to search for a travelling route based on the obtained attribute information about the at least one occupant.

3. The vehicle control apparatus according to claim 1, wherein:
the travelling mode comprises a plurality of previously prepared travelling modes for determining the travelling characteristic, the travelling modes being suitable for the respective types of sensitivity of the at least one occupant; and
the controller is configured to select, based on the obtained attribute information about the at least one occupant, one of the plurality of travelling modes, thus changing a current travelling mode of the vehicle to the selected one of the plurality of travelling modes.

4. The vehicle control apparatus according to claim 3, wherein:
a plurality of travelling modes are prepared to be suitable for the respective travelling modes; and
the controller is configured to select, based on the selected one of the plurality of travelling modes, one of the plurality of travelling routes, thus changing a current travelling route of the vehicle to the selected one of the plurality of travelling routes.

* * * * *